United States Patent [19]
Korth

[11] Patent Number: 5,629,070
[45] Date of Patent: May 13, 1997

[54] AUTHENTICATION LABEL AND AUTHENTICATING PATTERN INCORPORATING DIFFRACTING STRUCTURE AND METHOD OF FABRICATING THEM

[75] Inventor: Hans E. Korth, Stuttgart, Germany

[73] Assignee: International Business Machines Corporation, Armonk, N.Y.

[21] Appl. No.: 445,148

[22] Filed: May 19, 1995

[30] Foreign Application Priority Data

Nov. 9, 1994 [EP] European Pat. Off. ............ 94117660

[51] Int. Cl.$^6$ .................................. B32B 1/00; B32B 3/00
[52] U.S. Cl. .................. 428/174; 428/142; 428/143; 428/166; 428/167; 428/170; 428/195; 428/212; 359/2
[58] Field of Search ........................ 428/411.1, 913, 428/914, 142, 143, 166, 167, 170, 174, 187, 195, 212; 359/2

[56] References Cited

U.S. PATENT DOCUMENTS

| | | |
|---|---|---|
| 3,894,756 | 7/1975 | Ward . |
| 4,547,002 | 10/1985 | Colgate, Jr. . |
| 4,661,983 | 4/1987 | Knop . |
| 5,003,600 | 3/1991 | Deason et al. . |
| 5,145,212 | 9/1992 | Mallik . |

FOREIGN PATENT DOCUMENTS

| | | |
|---|---|---|
| 2093404 | 9/1982 | United Kingdom . |
| WO87/07034 | 11/1987 | WIPO . |

*Primary Examiner*—William Krynski
*Attorney, Agent, or Firm*—Daniel P. Morris

[57] ABSTRACT

A light diffracting structure 10 in an authenticating pattern 20 especially for an authentication label 30 is used for authenticating and protecting against forgery various valuable objects. The light diffracting structure 10 has unique parameters generating a uniquely colored pattern. The unique parameters are randomly defined by anisotropic process steps during the manufacturing of the diffracting structure and are not under full control of the producer. This prevents copying or creating an exact replica thereof. The authenticating pattern 20 comprises an integrated structure of a substrate layer 21 and a transparent overcoat layer 22 and the viewable interface therebetween includes the light diffracting structure 10. The uniquely colored authenticating pattern can be verified by simple observation with the naked eye which is a prerequisite for ubiquitous verification.

16 Claims, 4 Drawing Sheets

AUTHENTICATION LABEL AND AUTHENTICATING PATTERN INCORPORATING DIFFRACTING STRUCTURE AND METHOD OF FABRICATING THEM

FIELD OF THE INVENTION

This invention relates to a light diffracting structure and to an authenticating pattern especially for use in an authentication label for authenticating and protecting against forgery various valuable objects such as bank notes, credit cards, identification documents, authentication master plates, brand products or phonographic records.

It also relates to a process for fabricating the diffraction structure, the authenticating pattern and the authentication label.

BACKGROUND OF THE INVENTION

Sealing is a technique as old as civilization. It identifies the owner and indicates the integrity of an object. A written message becomes a document due to a sealing process. Today, sealing and printing techniques are used to avoid unauthorized replication of mass produced objects. However, an increasing economic damage results from forgery due to insufficient security. Security of the sealing process requires that a seal cannot be copied and that the seal stamper or printing plate are held under control. Removal of the seal should lead to its destruction when protection against transfer of seals is needed.

A complex engraved pattern is required to protect against forgery. Nevertheless, every structure created by human beings can be replicated with the necessary skill, information, equipment and time. Typically, the effort to recreate a seal stamper or printing plate will be similar or less than the effort for the production of the original. This has lead to an ever increasing complexity of the sealing process for valuable objects. Holograms can be used as an additional protection.

For authenticating documents and things U.S. Pat. No. 5,145,212 teaches the use of non-continuous reflective holograms or diffraction gratings. Such a hologram or diffraction grating is firmly attached to a surface that contains visual information desired to be protected from alteration. The reflective discontinuous hologram is formed in a pattern that both permits viewing the protected information through it and the viewing of an authenticating image or other light pattern reconstructed from it in reflection. In another specific authentication application of this US Patent a non-transparent structure of two side-by-side non-continuous holograms or diffraction patterns, each reconstructing a separate image or other light pattern, increases the difficulty of counterfeiting the structure.

PCT application WO87/07034 describes holograms, including diffraction gratings, that reconstruct an image which changes as the hologram is tilted with respect to the viewer and in a manner that images reconstructed from copies made of the hologram in monochromatic light do not have that motion.

In UK Patent Application GB 2 093 404 sheet material items which are subject to counterfeiting have an integral or bonded authenticating device which comprises a substrate having a reflective diffractive structure formed as a relief pattern on a viewable surface thereon and a transparent material covering the structure. Specified grating parameters of the diffractive structure result in peculiar, but easily discernable, optical colour properties that cannot be copied by colour copying machines.

U.S. Pat. No. 4,661,983 describes a random-pattern of microscopic lines or cracks having widths in the order of micrometers that inherently forms in a dielectric coating layer of an authenticating device incorporated in a secure document. It permits identification of a genuine individual document by comparing read-out line-position information derived by microscopic inspection with read-out digital codes of line-information obtained earlier at the time of fabrication of the document.

The digital data of the random cracks being stored after microscopically inspecting the document these data are used for the fabrication of cracks if the random pattern does not inherently develop.

Although these examples make forging more difficult, they can give no absolute protection. The digital data may be copied and the hologram information may be copied photographically or the hologram may be recreated. Minor deviations of holograms cannot be determined easily, as the extended non-monochromatic illumination within a real-world environment tends to reproduce hologram images with fuzzy shapes and colours.

Forgery of money causes significant economic loss. The advent of high quality copy machines severely threatens many currencies.

Identification documents like passports, identity cards or drivers licenses are used for different purposes, also for governmentally regulated purposes.

Credit cards or corporate badges identify the owner of an account or the employee of a company. In all these cases the document must combine information of the bearer with the authorization information from the issuing organization. An authentication label with personalization on identification documents helps to eliminate the risk to accept an invalid document and with the invention as claimed a machine-based verification is not necessary.

The protection of brand labels has long been a problem. Distribution packages for computer software, in particular, are highly threatened by forgery as the costs for the replication of the package, for example a CD-ROM, are low in comparison with the value of the copied data. An authenticating pattern or authentification label on the data carrier would allow the customer to purchase authorized products and it would allow him to prove the ownership at a legally fabricated product. If all the products of a class or brand were marketed with a personalized authentificating pattern or authentification label, the ownership claim for a stolen object like e.g. an automobile can be verified from an intact pattern or label. A missing pattern or label would indicate manipulation. The exchange of an authentificating pattern or authentification label would not make sense as it requires the possession of an identical product.

A unique pattern or label embedded into a write-once or read-only type data carrier allows to prove the integrity of large sets of coded data. With a reference to the authentificating pattern code or to the authentification label code stored with the data, it is not possible to copy modified data onto an identical data carrier. Attempts to modify data on the original carrier makes no sense as it affects e.g. checksums and other criteria. A forge-proof authentificating pattern or authentification label allows the use of large encoded databases like catasters, patent data bases or financial files as legally approved documents.

All these examples show that equipped with the authenticating pattern or the authentication label objects like money bills, passports, credit cards etc. gain maximum protection against forgery.

Master plates of the authenticating pattern testify the authorization of the label manufacturer.

It is therefore an object of the present invention to provide a light diffracting structure, an authenticating pattern and an authentication label with perceivable parameters where there is no way to directly copy or to recreate the light diffraction structure, the pattern, or the label.

BRIEF DESCRIPTION OF THE INVENTION

In accordance with the present invention, a light diffracting structure has parameters generating a visually identifiable colored pattern where the parameters are randomly defined by anisotropic process steps during the manufacturing of the diffracting structure. An authenticating pattern of the present invention comprises an integrated structure of a substrate layer and a transparent overcoat layer forming the light diffracting structure as a viewable interface therebetween. An authentication label includes at least one such authenticating pattern which contains personalizing information like pictorial and/or alphanumeric information. An authenticating pattern or an authentication label incorporating such a diffracting structure with randomly defined parameters is not under full control of the producer. Therefore, not even the producer or owner of an original authenticating pattern can copy it or create an exact replica thereof. The uniquely colored authenticating pattern can be verified by simple observation with the naked eye; thus simplifying the recognition by making use of the unsurpassed image processing properties of the human eye. This visual access to an authenticating pattern or an authentication label without a special illumination or equipment is a prerequisite for ubiquitous verification.

BRIEF DESCRIPTION OF THE DRAWINGS

Ways of carrying out the invention are described in detail below with reference to drawings showing only specific embodiments in which:

FIG. 2 shows a prior art example of a diffraction pattern or diffraction grating of a hologram and FIG. 2b illustrates characteristic curves of the diffraction pattern of FIG. 2a;

DETAILED DESCRIPTION

Figure 1:
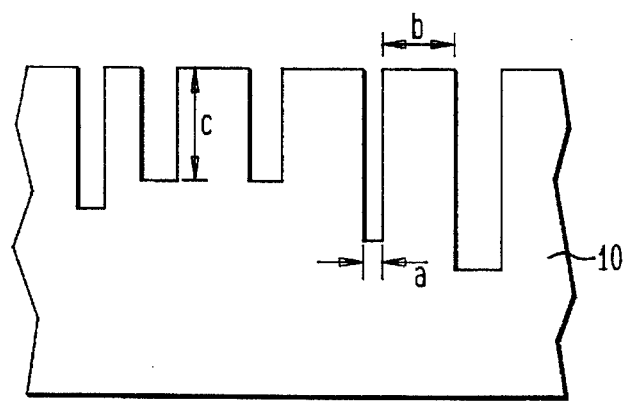
FIG. 1 schematically shows an embodiment of a light diffracting structure in form of a relief grating with some of the most important parameters.

The light diffracting structure shown in FIG. 1 is a relief grating 10 with numerous grooves or pits which may have the same or different groove or line depths c. Another important parameter of the diffracting structure 10 is the peak-to-valley ratio b:a.

An optical phase grating like the relief grating of FIG. 1 reflects incident light into various diffraction orders depending on the wavelength of the light, the grid line density, the grid depth which is the line depth c and the grid line profile or grid line anisotropy which is the peak-to-valley ratio b:a.

Figure 2A:
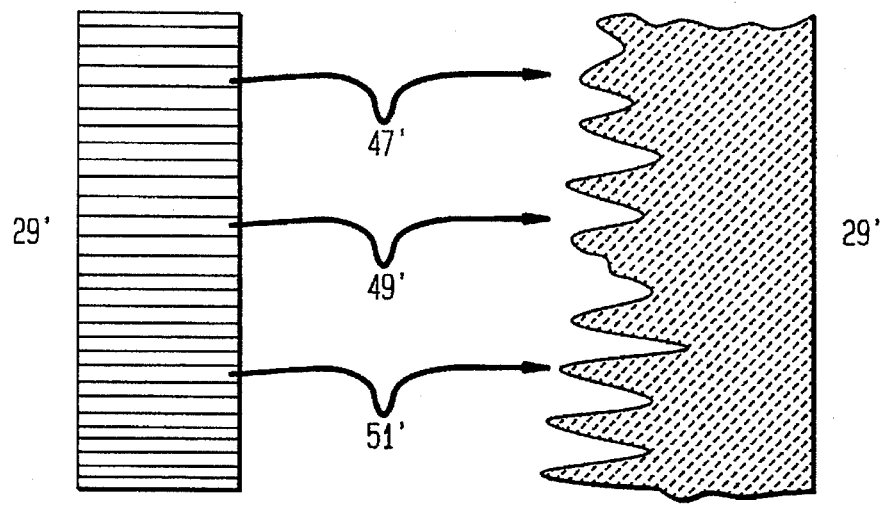
Figure 2B:
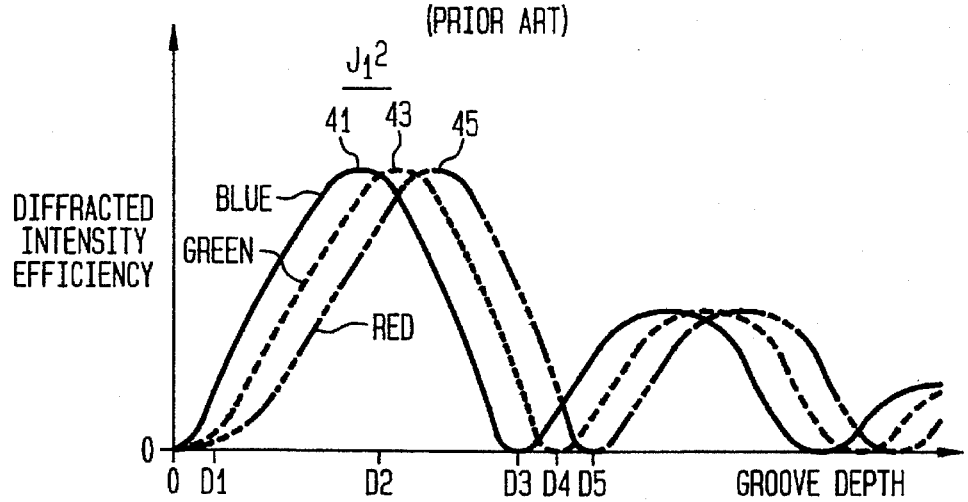

The diffraction colour varies strongly with the line depth c. This is shown in the prior art diffraction grating of hologram 29' of FIG. 2a with three adjacent grating regions 47', 49' and 51'. In this example the area 47' is constructed to have a groove depth which is substantially that indicated at D3 in FIG. 2b. The amount of light diffracted from that area into a blue component of the first order diffracted beam is zero, while there is some intensity in other colours. Similarly, the adjacent area 49' is made to have a groove depth substantially equal to D4 indicated in FIG. 2b, thus having no light diffracted in the green portion. Lastly, the region 51' is made to have a groove depth substantially equal to D5 of FIG. 2b, thereby having substantially no intensity diffracted into the red component of the first order diffracted beam.

Figure 4A:
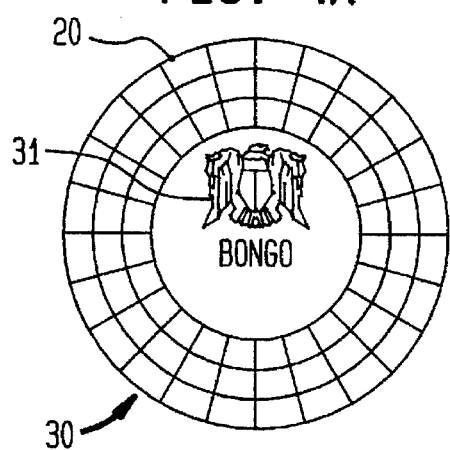
FIGS. 4a, 4b and 4c schematically illustrate embodiments of an authentication label with the authenticating pattern of FIG. 3.
Figure 4B:
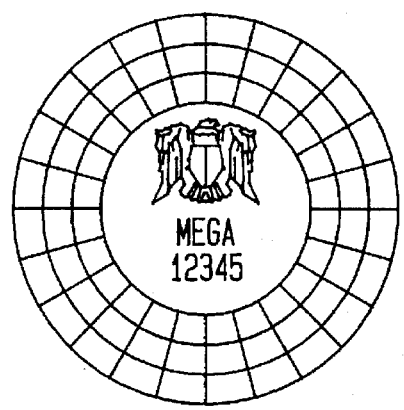
Figure 4C:
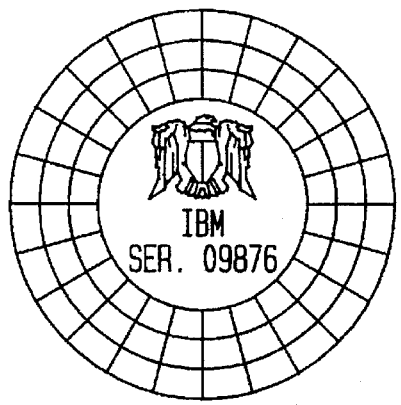

The diffraction colours representable by the diffraction structure 10 can be used to design the authenticating patterns 30 of FIGS. 4a–4c that contain colour field information. By design these colours may only be roughly determined, there are no "correct" colours and there is no fuzziness due to imperfect replication.

Variations in the line depth c of some 10 nm can be observed easily and an even higher sensitivity of about 5 nm can be achieved when the visibility of the borderline between two similar grating regions, areas or colour fields is judged.

The saturation of the diffraction colours depends on the peak-to-valley ratio b:a of the diffracting structure 10. It gives a highly sensitive colour field discrimination criterion. The visual deviation of a nominally diffracting structure 10 depends exclusively on the non-linearity of the manufacturing process.

The relative intensity of the diffraction colours depends on the grid profile and the surface roughness or microroughness. The grid profile comprises a widespread variety of different shaped gridlines like rectangular gridlines or gridlines with rounded corners.

Instead of a relief grating as shown in FIG. 1 the diffracting structure may be an arrangement of periodic areal structure elements.

Figure 3:
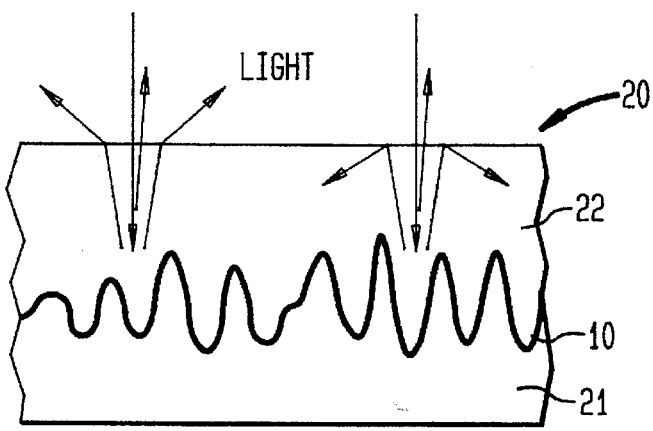
FIG. 3 is a schematic diagram of an authenticating pattern with the light diffracting structure of FIG. 1.

The authenticating pattern 20 of FIG. 3 is an integrated structure of a substrate layer 21 and an overcoat layer 22.

The interface between substrate layer 21 and overcoat layer 22 is viewable and includes the light diffracting structure 10. If the overcoat layer 22 covering the relief grating 10 is transparent, light diffracted at angles above some 45 degrees may be caught within the overcoat layer 22 due to total internal reflection as indicated in FIG. 3, right side. For a grid or relief grating with more than approximately 2000 lines/mm already the first order diffraction will be caught. This high line density assures total internal reflectance within the overcoat layer 22. In this case the specularly reflected light appears in the interference colour that is defined by the line depth c of the relief grating or grid. The material of the substrate layer 21 and the overcoat layer 22 comprises transparent amorphous materials like polymers, resins and artificial resins which may also be coloured. The transparent overcoat layer 22 is bonded to said substrate layer 21 in a manner sufficiently secure to prevent said overcoat layer 22 from being removed from said substrate layer 21 without destroying said substrate layer.

The integrated structure may comprise a metal layer overcoating said diffracting structure. Especially in the fabrication of compact disks a metal layer may be applied for high reflectance. The metallization layer may be homogeneous or made from randomly sputtered metal particles.

A bonding layer will provide the interface between the authenticating pattern or authentification label containing one or a plurality of the integrated structures and the object to be protected.

If the metallization layer is not homogeneous and if the material of the overcoat layer 22 and the bonding layer is identical, it will be impossible to free the relief surface within the 10 nm tolerance.

Alternatively, the relief grating may be filled with a transparent material with different refractive index. This would further impede the mechanical access to the undistorted relief. In this embodiment a flat metal coating may be added.

FIGS. 4a to 4c show various kinds of authentication labels 30 with authenticating patterns or colour fields 20 of FIG. 3. The authentication labels 30 consist of at least one authenticating pattern 20 or a distinct number of authenticating patterns allowing several different kinds of geometrical arrangements and additional personalizing information 31.

The authenticating patterns may be combined to form bigger uniform colour fields or fields with colour gradients. Regular geometrical arrangements help to memorize the colour shade crossover locations. From the locations of characteristic shades a code number may be derived and this number may be memorized or communicated with ease.

Figure 6:
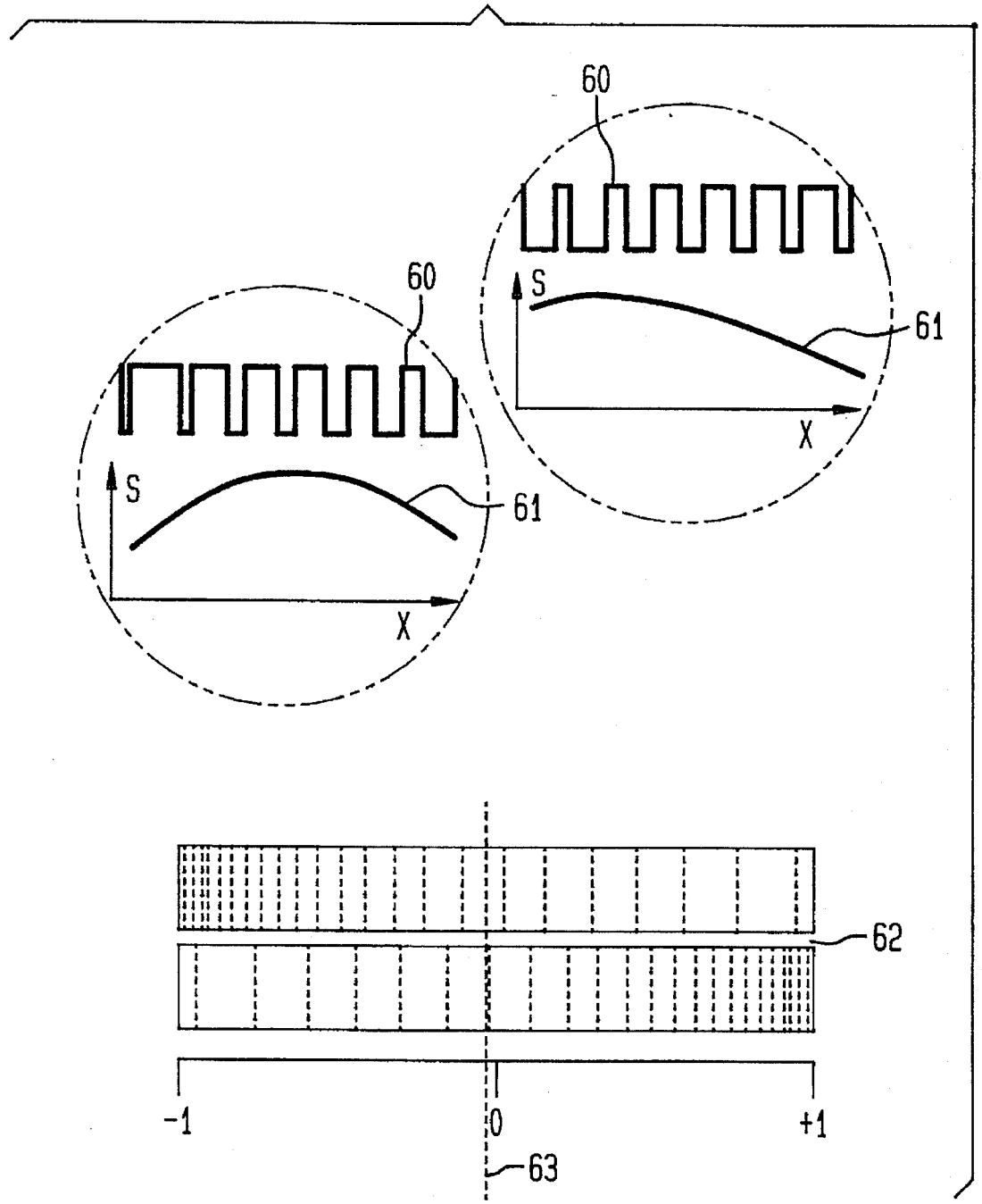
FIG. 6 schematically illustrates a possible method for quantifying the colour of the authentication label.

A possible method for quantifying the colour of the authentication label is indicated in FIG. 6. This method uses the fact that the saturation of the diffraction colours depends on the peak-to-valley ratio b:a of the diffracting structure 10.

Varying the peak-to-valley ratio continuously within a relief structure 60 enhances the colour contrast until maximum colour saturation is reached as shown by the colour saturation curve 61. Using two relief structures with the peak-to-valley variation to reach maximum contrast running into opposite directions and two scales 62 easily allows to define an equality mark 63 which represents a quantitative size. A system based on this effect would allow the translation of random colours and shades into a numeric code that allows quantitative pattern classification.

The personalizing information comprises pictorial or alphanumeric information and/or holograms or holographic elements or any combination thereof. A logo of the issuing authority could easily be incorporated which facilitates the memorizing of the colour pattern.

The authentication label offers a great variety of different possible shapes. In the embodiments shown in FIGS. 4a to 4b the authentification label 30 is substantially circular in shape and the authenticating patterns 20 are concentrically arranged around the personalizing information 31 provided in the center of the circle. A substantially circular or rounded shape complicates or impedes the peeling from the objects equipped with an authentication label.

Although it is virtually impossible that the colour parameters match accurately for a multitude of colour fields within an authenticating pattern 30 shown in FIGS. 4a–4c, there are more parameters that depend on the diffractive structure.

A macro-roughness superimposed over the grid pattern may be modulated to produce areas in the surface of the diffractive structure varying between specular and diffuse reflexion. In the areas of specular reflexion the line depth c is nearly zero and there are no diffraction colours to be observed. Specular reflectance and diffuse scatter can be judged independently by comparison with areas or fields of pure specular reflectance or pure scatter.

The polarization state of the light reflected from the authenticating pattern 20 results from the interaction of the diffractive structure 10 and the overcoat layer 22. It is wavelength dependent.

The shape of the gridlines and their anisotropy affects the appearance of the diffracted light that leaves the overcoat layer 22 without total reflexion as indicated in FIG. 3, right side.

An appropriate design allows to prepare colour fields 20 that exhibit characteristic colour changes as a function of the two tilt angles.

The selection of the grid line direction allows to steer the diffraction pattern individually for every location on the authenticating pattern.

The characteristic absorption of the overcoat layer 22 as a function of the wavelength affects the fate of the totally reflected light. The variation of the colour with the incidence angle depends on the refractive index of the overcoat layer.

The influence of the refractive index and the characteristic absorption of the overcoat layer material restricts the options to use alternative materials for a copy. The superposition of a number of different grid structures allows arbitrary combinations of colour effects.

Figure 5A:
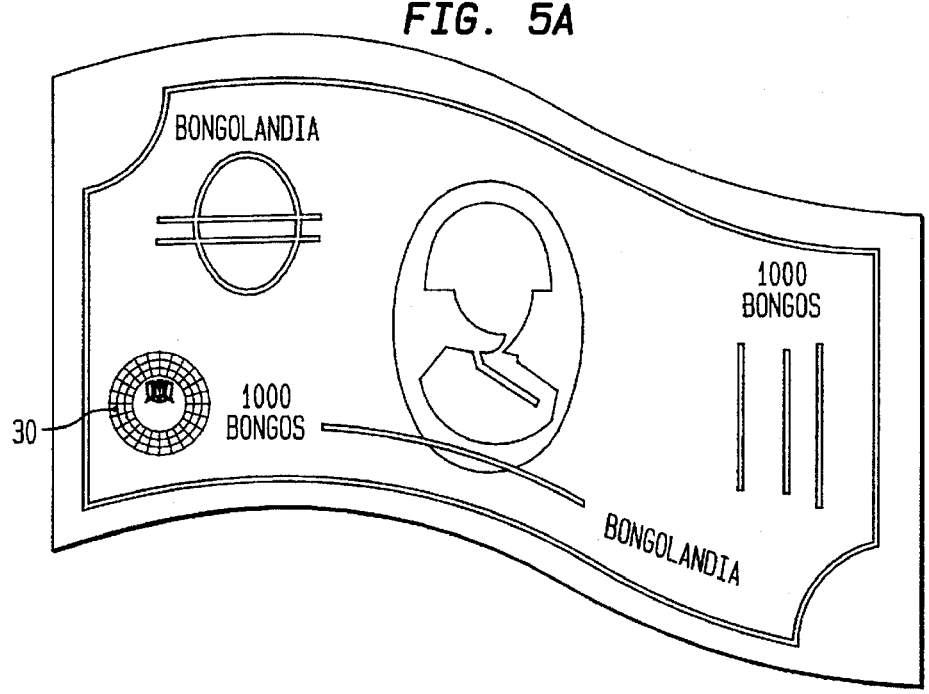
FIGS. 5a, 5b and 5c show different objects equipped with an authentication label.
Figure 5B:
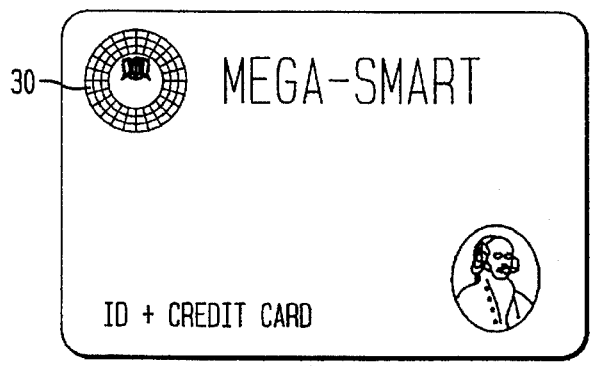
Figure 5C:
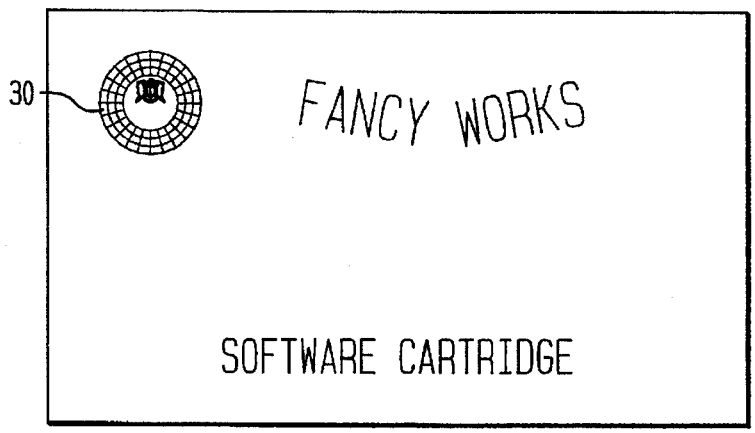

Some possible objects, especially credit cards and identification cards, which could be equipped with an authentication label 30 are shown in FIGS. 5a to 5c. Various other valuable objects such as bank notes, identification documents, authentication master plates, brand products or phonographic records could also be equipped with one or more of the authentication labels described above.

Methods for producing a diffracting structure or a master plate will now be described in detail.

To generate the light diffracting structure 10 with high structure density, the manufacturing technology for advanced semiconductor products can be adapted.

A mask for the horizontal pattern of the light diffracting structure may be generated from computer data. On a substrate a layer of photoresist is deposited and the mask pattern is then transferred into the photoresist layer. After development the patterned resist layer is used as a mask during the step of etching pits or grooves into the substrate. The etch depth defining the line depth c of the relief grating 10 also depends on the size of the apertures in the photoresist. Various techniques are available to obtain an anisotropic etching characteristic, like wet etching and photochemical etching. With photochemical etching the etch depth may be affected by a locally variable illumination. After the etching step being completed the patterned photoresist layer is removed.

To obtain the authenticating pattern 20 an overcoat layer 22 is deposited on the substrate and fills the pits.

The diffracting structure 10 obtained as described above may also be used as a master plate for generating numerous identical authenticating patterns 20. To achieve this, the pattern of the diffracting structure is replicated in a substrate by stamping or molding processes using the diffracting structure 10 as a master plate. The substrate typically is of transparent polymeric material. For individualization additional information may be written into the molded relief by laser burning or other known techniques. The extent of parameter variations of said authenticating patterns caused by said replication step is insignificant compared to the extent of parameter variations defined by said anisotropic etching process step during the manufacturing of the diffracting structure 10.

An additional effect preventing copying is the shrinking of material after the molding process. The shrinking smoothens the relief grating 10 and even if a copy of the relief structure were possible, the preparation of a new master plate would require an unshrinking and a relief-sharpening process. This seems not feasible.

Submaster plates for generating authentication patterns may be produced from the master plate by well-known replication techniques. The submaster plate should obtain a personalization pattern to prevent the production of another master plate. The personalization may contain additional self-encoded information. This allows to verify both the authenticity of the diffracting structure as a master plate and the descendence from the master plate.

To complete the authenticating pattern 20 an overcoat layer 22 is deposited on the substrate 21 and fills the pits. Additional personalizing information like pictorial or alphanumeric information or any combination thereof is added to the substrate layer 21 or to the overcoat layer 22 or to both of them. The personalizing information may be written into said layers by laser burning, by stamping or by molding processes.

According to the manufacturing methods described above with their random process steps unique authenticating patterns or authentification labels may be created with perceivable random variation of the pattern or label. The random variation is large as compared to the statistical variations during the replication processes like stamping or molding and the randomization space is too big for a systematic experimental recreation. All this avoids an authenticating pattern or an authentication label of the invention being copied directly or to produce a master plate from the pattern or label.

I claim:

1. A light diffracting structure having parameters generating a visibly distinguishable colored pattern that is used to validate the authenticity of an object attached to the structure wherein said parameters are randomly defined by anisotropic process steps during the manufacturing of said diffracting structure.

2. The light diffracting structure of claim 1
wherein said light diffracting structure comprises a structure in the form of a relief grating and an arrangement of periodic areal structure elements in the light diffracting structure.

3. The light diffracting structure of claim 2
wherein said parameters comprise the peak-to-valley ratio b:a and the line depth c of the relief grating.

4. An authenticating pattern for an object comprising
an integrated structure of a substrate layer and a transparent overcoat layer formed on the object,
the layers defining a viewable interface therebetween including a light diffracting structure randomly defined by anisotropic steps during the manufacture of the diffracting structure to produce a visibly distinguishable colored pattern that is used to validate the authenticity of the object.

5. The authenticating pattern of claim 4
wherein said transparent overcoat layer is bonded to said substrate layer in a manner sufficiently secure to prevent said overcoat layer from being removed from said substrate layer without destroying said substrate layer.

6. The light diffracting structure of claim 4
wherein said light diffracting structure includes a structure in the form of a relief grating.

7. The light diffracting structure of claim 6
wherein said parameters comprise the peak-to-valley ratios b:a and the line depths c of the relief grating.

8. An authentication label as part of an object comprising:
a) an integrated structure of a substrate layer and a transparent overcoat bonded to the substrate layer to define therebetween a viewable interface including a light diffracting structure randomly produced by an anisotropic process during the manufacture of the diffracting structure to produce a visibly identifiable authenticating pattern; and
b) graphic personalization information formed in said integrated structure.

9. The authentication label of claim 8,
wherein said authentication label is substantially circular in shape and the authenticating patterns are concentrically arranged around the graphic personalizing information provided in the center of the circle.

10. The authentication label of claim 9,
wherein said graphic personalizing information comprises a hologram.

11. The light diffracting structure of claim 10,
wherein said light diffracting structure includes a relief grating.

12. The light diffracting structure of claim 11,
wherein said parameters include the peak-to-valley ratios b:a and the line depths c of the relief grating.

13. The authenticating pattern of claim 12
wherein said light diffracting structure has more than approximate 2000 lines/mm to assure total internal reflectance within said overcoat layer.

14. The authenticating pattern of claim 5
wherein said integrated structure further comprises a metal layer overcoating said diffracting structure.

15. The authenticating pattern of claim 13
wherein the material of said substrate layer and said overcoat layer comprise transparent amorphous materials.

16. The light diffracting structure of claim 8
wherein said graphic personalization information is contained in both said substrate layer and said transparent overcoat.

* * * * *